D. E. HERSHEY.
ALARM FOR AUTOMOBILES.
APPLICATION FILED JAN. 20, 1919.
1,395,276.
Patented Nov. 1, 1921.
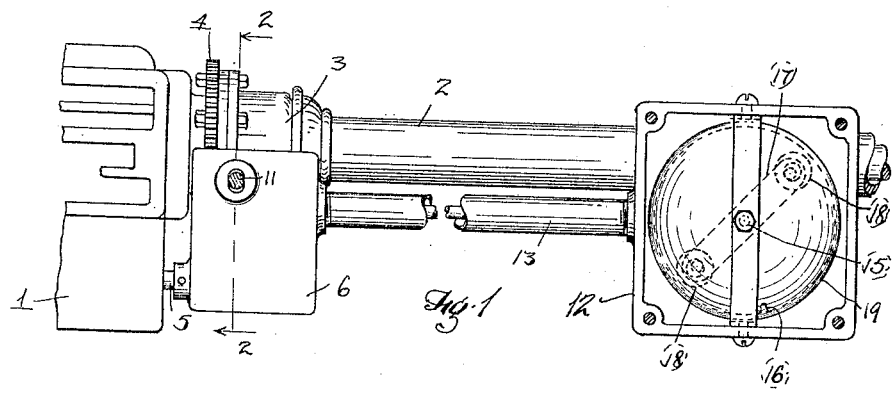
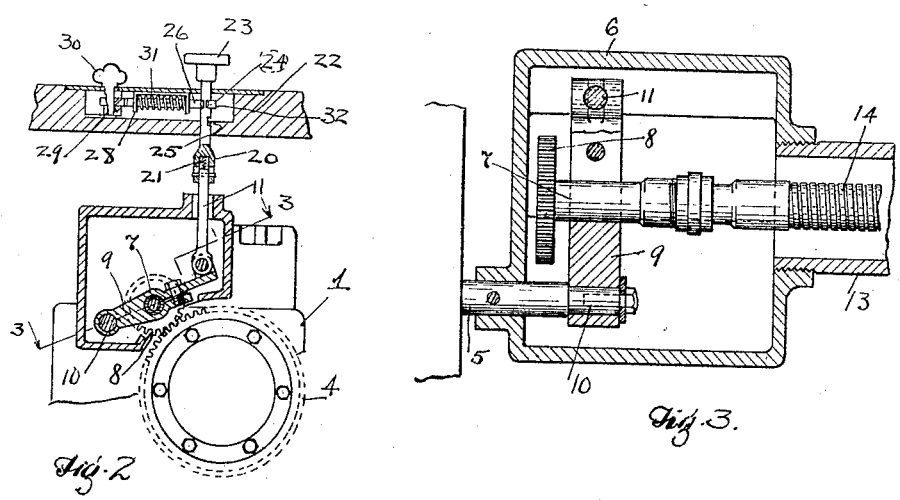
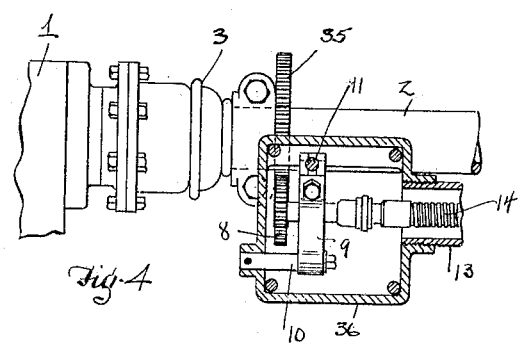
INVENTOR
Delmer E. Hershey
BY
Day, Oberlin & Day
ATTORNEYS.

UNITED STATES PATENT OFFICE.

DELMER E. HERSHEY, OF LORAIN, OHIO.

ALARM FOR AUTOMOBILES.

1,395,276.        Specification of Letters Patent.      Patented Nov. 1, 1921.

Application filed January 20, 1919. Serial No. 271,981.

*To all whom it may concern:*

Be it known that I, DELMER E. HERSHEY, a citizen of the United States, and a resident of Lorain, county of Lorain, and State of Ohio, have invented a new and useful Improvement in Alarms for Automobiles, of which the following is a specification; the principle of the invention being herein explained, and the best mode in which I have contemplated applying that principle, so as to distinguish it from other inventions.

The present invention, relating, as indicated, to alarms for automobiles, is directed to an alarm mechanism adapted to be attached to a motor-driven vehicle for operation immediately upon any unauthorized use of that vehicle, means being provided to disconnect the alarm so that it will not be operated when the vehicle is used by the owner. It has been found that the theft of automobiles, which is now such a serious problem in all cities, can be effectively stopped by the use of such device, and it is one object of the present invention to apply such a device which shall be simple, inexpensive to construct, convenient to install on the vehicle and easy of operation for the user. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing.

Figure 1 is a plan view of the propeller shaft of a vehicle and rear end of the transmission case thereof showing my mechanism installed thereon; Fig. 2 is a section on the line 2—2, Fig. 1; Fig. 3 is a section on the line 3—3, Fig. 2; and Fig. 4 is a plan view similar to Fig. 1, showing a modification of the invention.

In Fig. 1, I have shown the rear end 1 of the transmission case of an automobile, extending rearwardly from which is a propeller shaft 2 joined to the shaft extending out of the transmission case by means of the universal joint 3. This is the common construction and need not be further described. It is common in many vehicles to drive the speedometer from the propeller shaft and for this purpose many of the vehicles now in use mount a small gear 4 on the shaft extending from the transmission case. This gear 4 is exposed and operates the flexible speedometer shaft through a suitable connection and may very conveniently be used for driving the operating mechanism of my device.

Mounted upon a stud 5, projecting from the transmission case is a casing 6, in which is mounted the shaft 7 carrying a small gear 8, which may be brought into engagement with the speedometer gear 4. This gear 8 and shaft 7 are carried on a rocker arm 9, pivoted about an axis 10 and operated by means of a vertically movable rod 11, which passes through an opening in the top of the casing 6. The gear 8 is normally held out of engagement with the gear 4 by means of the rod 11, which is raised to rock the arm 9 in a counter-clockwise direction, and in this way swings the gear 8 away from the gear 4. When the mechanism is in this condition there is no operation of the alarm, and my device interferes in no way with the usual operation of the vehicle.

Mounted a short distance from the casing 6 is a second casing 12, which may conveniently be mounted on the floor boards of the vehicle, and which is connected to the casing 6 by means of a conduit 13. Through this conduit 13 there extends a flexible shaft connected to the shaft 7 and inclosed in a coiled wire conduit 14. The flexible shaft is connected to a stub shaft 15 which carries an arm 17 that has two clappers or small disks 18 disposed on its ends and having a slotted connection with pins mounted thereon, so that as the arm 17 is rotated rapidly the clappers are thrown outwardly and are made to strike a projection 16 on the inside of a gong 19, which is mounted in the case 12. Thus upon operation of the gear 8 and flexible shaft inclosed in the conduit 14, the gong 19 is rapidly and continuously sounded so long as the driving engagement between the gears 8 and 4 is continued. It will be apparent that it is immaterial whether the casing 12 be mounted in alinement with the casing 6 and upon the floor boards of the vehicle, or at some other point, as the selection of another location for this casing means merely a longer flexible shaft and a suitable connecting conduit 13 between the two casings.

The means for causing an engagement between the gears 4 and 8 consist of the rod 11, shown in Fig. 2 as entering a socket formed in an extension 20 of such rod, with the coiled spring 21 disposed between the two, and means for locking the rod 20 in either of two positions. This rod 20 extends through the floor boards 22 of the car into the driver's compartment thereof, and carries a pedal or push button 23 at its upper end. It is provided with two notches or recesses 24 and 25, adapted to receive therein, and be locked by, a rod 26 mounted in a suitable frame 28 and operated by means of a lock 29 and key 30. A spring 31 serves to normally cause engagement of the flange 32 formed on the end of the rod 26 with whichever one of the notches 24 or 25 is in registration therewith, and during the ordinary operation of the vehicle the notch 25 is engaged, thus holding the rod 11, and arm 9 and gear 8 up, and preventing engagement between the gears 4 and 8. When the user desires to leave the car he unlocks the lock, depresses the button 23 and then locks the lock, with the flange 32 engaging the uppermost notch 24. The alarm is then locked in position for operation upon the operation of the vehicle, and as all parts are inclosed it is a difficult matter, and one that cannot be carried out without attracting attention, to disconnect any part of the mechanism so that the car may be operated without operation of the alarm. In Fig. 4 I have shown means for operating the device from the gear 35, mounted on the propeller shaft behind the universal joint 3, which modification may be used in case the car has no speedometer driving gear on the propeller shaft. The construction shown in Fig. 4 is otherwise the same, except that the casing 36, inclosing the driving gears and rocker arm, must be otherwise mounted than on the transmission case and this can be done by securing it to the floor boards of the car as there is very little play between the forward end of the propeller shaft and the floor boards. This play is insufficient to move the driving gears out of engagement with each other when once engaged.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a device of the character described, the combination of an engine-driven shaft, an exposed gear thereon, a casing mounted adjacent said gear and having an opening, an element rotatably mounted in said casing and pivotally mounted so as to extend through such opening and engage with said gear, an alarm, the casing inclosing said alarm, and flexible connections between said element and said alarm and a conduit secured in said two casings and surrounding said flexible connections.

2. In a device of the character described, the combination of an engine-driven shaft, an exposed gear thereon, a casing mounted adjacent said gear and having an opening, an element rotatably mounted in said casing and pivotally mounted so as to extend through such opening and engage with said gear, an inclosed alarm, flexible connections between said element and said alarm, and means including a resilient lost motion connection for rocking said element into its engaging position.

3. In a device of the character described, the combination of an engine-driven shaft, an exposed gear thereon, a casing mounted adjacent said gear and having an opening, an element rotatably mounted in said casing and pivotally mounted so as to extend through such opening and engage with said gear, an inclosed alarm, flexible connections between said element and said alarm, means including a resilient lost motion connection for rocking said element into engaging position, and means for locking said element in such position.

Signed by me, this 17th day of January, 1919.

DELMER E. HERSHEY.